Figure 1:
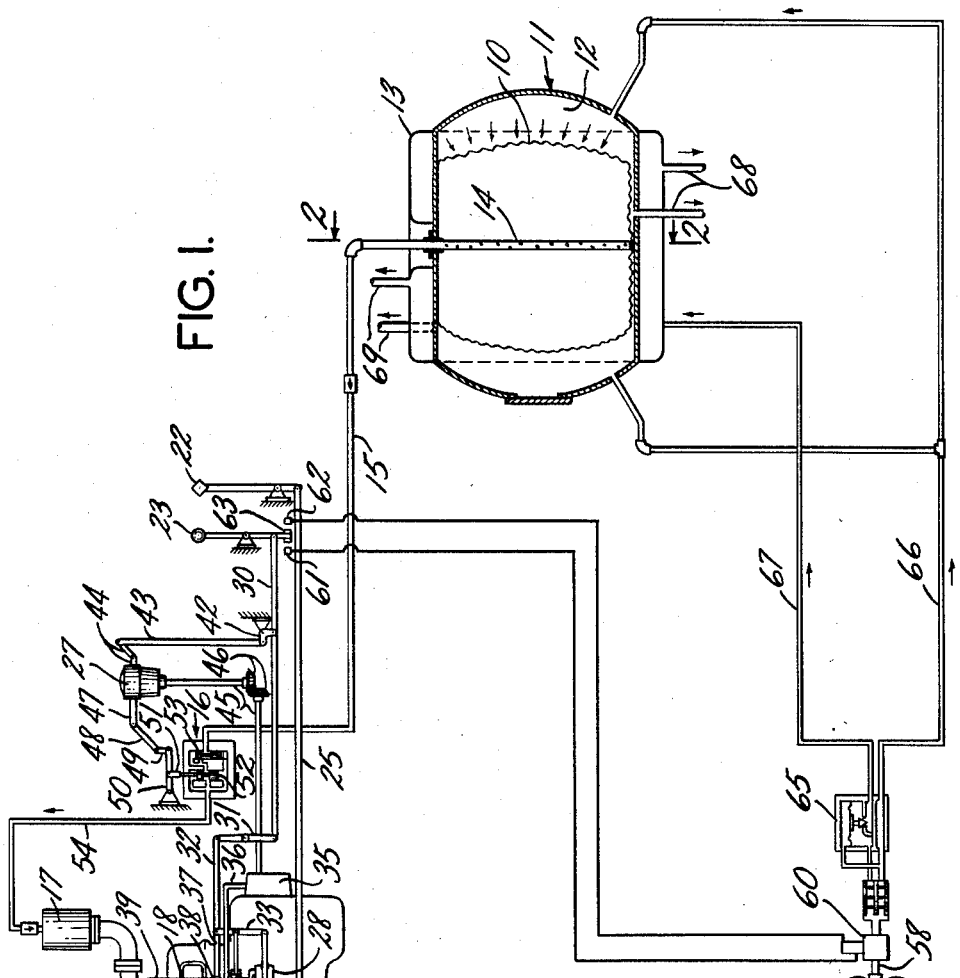

Dec. 1, 1959 R. PERRIER 2,915,030
ENGINE FUEL SUPPLY SYSTEM FOR DIRIGIBLE VEHICLE POWER PLANT
Filed Oct. 14, 1953

INVENTOR.
ROBERT PERRIER
BY
Campbell Brumbaugh & Graves
his ATTORNEYS

United States Patent Office 2,915,030
Patented Dec. 1, 1959

2,915,030

ENGINE FUEL SUPPLY SYSTEM FOR DIRIGIBLE VEHICLE POWER PLANT

Robert Perrier, Farmingdale, N.Y., assignor to Fairchild Engine and Airplane Corporation, Farmingdale, N.Y., a corporation of Maryland Application October 14, 1953, Serial No. 386,066

16 Claims. (Cl. 114—16)

This invention relates to a fuel supply system for self-contained power plants, such as a submarine vehicle propulsion system, although the invention is not limited to that use.

The utilization of local oxidation agents for supporting the combustion of hydrocarbon fuels in the absence of atmospheric oxygen has reached a high stage of development, but the alternative use of atmospheric oxygen and local oxygen-producing agents, such as hydrogen peroxide or liquefied oxygen without major compensatory adjustments for elevation above or submersion below sea level has remained a problem, since the modern concept of a strategic vehicle is indifferent to its elevation or submersion, since both conditions are contemplated.

In accordance with the present invention, a fuel supply system for the propulsion power plant of a dirgible vehicle is provided, in which either atmospheric or local oxidation of hydrocarbon fuels is afforded at will without interruption of operation of the power plant in performing its function of propelling the vehicle, with due compensation for the operational requirements of the vehicle regardless of its degree of elevation above or submersion below sea level, as the case may be.

In a preferred embodiment of the invention, as adapted for a submarine vehicle, the propulsion power plant is alternatively supplied with atmospheric oxygen or oxygen from a local oxygen source, such as a catalytically-activated supply of hydrogen peroxide, under the control of the operator, with automatic compensation of trim and mass as the depth of submersion varies and the supply of fuel and oxidant changes in accordance with the utilization thereof.

More particularly, the invention provides a single control for shifting the fuel supply system from utilization of atmospheric oxygen to hydrogen peroxide as the combustion-supporting oxidant, with means being provided for not only compensation for loss of weight of consumed combustion materials, but also for the difference in density between the peroxide and the surrounding medium, such as sea water, whereby no substantial change in trim or mass of the vehicle occurs by reason of the consumption of fuel and/or oxidant.

It will be seen that the fuel supply system of this invention is adaptable without interruption of the propulsion power plant of a dirigible vehicle to atmospheric or self-contained oxidant use and enables operations at various degrees of elevation above or below sea level without affecting the operation of the vehicle by reason of consumption of fuel or oxidant incidental to the propulsion thereof.

Figure 2:
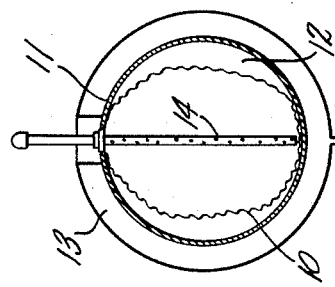

For a more complete understanding of the invention, reference may be had to the accompanying drawings, in which:

Figure 1 is a schematic diagram of the fuel supply system of this invention, as adapted to a submarine boat propulsion power plant; and Figure 2 is a transverse section through the hydrogen peroxide tank as seen along the line 2—2 of Fig. 1.

Referring to the drawings, numeral 10 designates the plastic bag containing the local oxidant such as hydrogen peroxide, preferably at a concentration of about 90%, liquefied oxygen, or other high percentage oxygen-containing or oxygen-liberating material suitable for supplying the oxygen necessary to support the combustion of a hydrocarbon fuel in an internal combustion engine, such as a reciprocating piston or turbine type. Assuming that the oxidant contained within bag 10 is hydrogen peroxide, the bag 10 may be made of a polyethylene-impregnated fabric cemented to the interior surface of a cylindrical steel tank 11 extending laterally beyond each side of the bag 10, so as to afford the peroxide-displacing water chambers 12 at opposite sides of the bag as shown in Figs. 1 and 2.

Surrounding the tank 11 and mounted coaxially thereon is the annular compensating tank 13 having no communication with either bag 10 or tank 11, but having a function related to that of bag 10, as will be described.

Sealed through the wall of tank 11 and its contained peroxide bag 10 is a perforated draw-off tube 14 connected by pipe 15 through a flow control valve 16 and catalytic decomposition chamber 17 to the intake manifold 18 of the power plant 19 which is shown as a stationary reciprocating engine, preferably of the diesel type. Hydrocarbon fuel supplied by fuel tank 20 is injected into the manifold 18 or the cylinders of the engine 19 by the engine-driven fuel pump 21 in accordance with alternative throttle controls 22 and 23, depending on whether the engine is operating on atmospheric air or on peroxide as the fuel oxidant, respectively.

In case the engine 19 is operating on atmospheric air, such as when the submarine boat is on the surface, air is drawn into the engine manifold 18 through the usual air filter 24 connected thereto. The control of the fuel supply by fuel pump 21 is effected by the manual throttle lever 22 which is pivoted on the control panel and is connected to the valve of fuel pump 21 by rod 25 and lever 26, which is generally the conventional control arrangement for atmospheric air operation of the engine 19.

The novel single lever control system for shifting from atmospheric air operation to local or self-contained oxidant operation includes the connection from throttle lever 23 to engine-driven governor 27, servo-control 28 for fuel pump 21 and air shut-off valve 29.

The connection from throttle lever 23 for conversion to peroxide, for submerged operation in the case of a submarine boat, to the servo-control 28 for fuel pump 21 is by linkage 30, 31, 32, 33, whereby the control valve 34 is positioned by the aforesaid linkage for controlling the supply of fluid pressure from engine-driven pump 35 and piping 36 to the hydraulic servo-motor 28 whose piston is accordingly adjusted to increase the fuel supplied by fuel pump 21 to the engine 19. Approximately 15% more fuel is required when the engine is running on peroxide than when air is the fuel oxidant. When control lever 23 is restored to inactive position, the linkage 30, 31, 32, 33, returns control piston 34 to the neutral position shown in Fig. 1 so that servo-motor 28 is in balanced or inactive position.

The connection from throttle lever 23 to the air shut-off valve 29 is by an extension 37 from link 32 to valve 38 in hydraulic pressure line 36 leading via pipe 39 to the cylinder and piston combination 40 for closing valve 29 to thereby close the air intake to manifold 18. Valve 29 is normally biased toward open position by spring 41, so that when valve 38 is reclosed by restoration of control lever 23 to inactive position, the hydraulic fluid in 40 is returned by spring 41 to a sump, not shown.

The connection between peroxide control lever 23 and governor 27 is by lever 42 connected to linkage rod 30, rod 43 and linkage 44 for effecting in accordance with the speed of the engine, control of the supply of peroxide to the catalyst chamber 17 through control valve 16. Governor 27 is driven from the engine 19 by shafting 45 and gearing 46 and is connected by links 47, 48, 49, 50 and 51 to control piston 52 of valve 16, whereby the position of piston 53, actuated by the peroxide pressure in supply line 15, is controlled to regulate the supply of peroxide to catalyst chamber 17 through pipe 54. When control lever 23 is returned to inactive position for reconversion to atmospheric air operation, governor 27 effects stopping of the peroxide supply by means of piston 52.

The means by which the hydrogen peroxide is supplied from plastic bag 10 under a pressure of between about 25 to about 75 pounds per square inch above ambient sea water pressure through perforated tube 14 and piping 15 to the peroxide control valve 16 is by water supplied under pressure to the exterior of the plastic bag 10. This pressure water is pumped in to chambers 12 from the sea water circulating system in the compartment for engine 19 and indicated generally as a tank 55. Water is drawn from supply 55 through pipe 56 by pump 57 driven by engine 19 as indicated in Fig. 1. The discharge of pump 57 through pipe 58 is controlled by solenoid valve 60 opened or closed by engagement of contacts 61 or 62 by a switch 63 on control lever 23.

The pressure water is supplied through valve 60 to a flow divider 65 of known construction and operation for proportioning the flow of water between chambers 12 and compensating chamber 13 in a manner similar to that provided by the proportioning valve used on aircraft type jet engines for proportioning the fuel to the various fuel nozzles. Essentially a diaphragm type valve operated by the pressure in one of two supply pipes regulates the flow through the other in a predetermined ratio. Thus, proportioning valve 65 is set to proportion the flow of water between pressure compartments 12 and compensating tank 13 so that the weight of the water added equals the weight of the peroxide displaced from bag 10 at all times. Since the peroxide is 1.36 times as heavy as sea water, more water is required than is supplied to compartments 12 and the additional water is supplied to compensating tank 13 in the required amount as predetermined by proportioning valve 65. Thus, the pressure water required to express the peroxide from bag 10 is supplied through valve 65 to compartments 12 by pipe 66 and the compensating water is supplied through valve 65 to compensating tank 13 by pipe 67. Suitable draw-off pipes 68 and air vents 69 will be necessary as understood.

Operation of the fuel supply system of this invention will be understood from the foregoing description of the system and functioning of its several parts, it being understood that the system may be used for operations on the surface with the self-contained oxygen and in rarefied atmospheres, although the conditions of compensation for peroxide use will be different than that described in connection with submerged operation in a submarine boat.

Although a preferred embodiment of the invention has been illustrated and described herein, it will be understood that the invention is not limited thereby, but is susceptible of changes in form and detail within the scope of the appended claims.

I claim:

1. In a fuel supply system for an internal combustion engine, the combination of a variable volume container having a movable wall and containing fluid oxidant for supporting combustion of fuel in said engine, a connection between the interior of said container and said engine, a receptacle exterior of said container and enclosing said wall, a second separate receptacle, a source of liquid, a pump connected to said source and having its output connected to said first receptacle for supplying liquid under pressure thereto for moving the wall thereof and thereby to express oxidant from said container to said engine, a connection from said pump to said second receptacle, and means interposed in one of said connections and responsive to the flow of liquid from said pump for dividing the liquid between said first and second receptacles.

2. In a fuel supply system for an internal combustion engine, the combination of a variable volume container having a movable wall and containing fluid oxidant for supporting combustion of fuel in said engine, a connection between the interior of said container and said engine, a receptacle exterior of said container and enclosing said wall, a second separate receptacle secured to said first receptacle, a source of liquid, a pump connected to said source and having its output connected to said first receptacle for supplying liquid under pressure thereto for moving the wall thereof and thereby to express oxidant from said container to said engine, a connection from said pump to said second receptacle to supply liquid thereto and thereby increase the weight thereof, and means interposed in said last-named connection and responsive to the flow of liquid from said pump to said first receptacle for proportioning the liquid between said first and second receptacles to adjust the weight of both receptacles in accordance with the difference in specific gravity between the oxidant-displacing liquid in the first receptacle and oxidant displaced.

3. In a fuel supply system for an internal combustion engine, the combination of a collapsible container of fluid oxidant for supporting combustion of fuel in said engine, a connection between the interior of said container and said engine, a receptacle for said container, a second separate receptacle, a source of liquid, a pump connected to said source and having its output connected to said first receptacle for supplying liquid under pressure thereto to collapse said container and thereby to express oxidant therefrom to said engine, a connection from said pump to said second receptacle, and means interposed in said last-named connection and responsive to the flow of liquid from said pump to said first receptacle for regulating the flow of liquid to said second receptacle.

4. In a fuel supply system for an internal combustion engine, the combination of a collapsible container of fluid oxidant for supporting combustion of fuel in said engine, a connection between the interior of said container and said engine, a receptacle for said container, a second separate receptacle secured to said first receptacle, a source of liquid, a pump connected to said source and having its output connected to said first receptacle for supplying liquid under pressure thereto to collapse said container and thereby to express oxidant therefrom to said engine, a connection from said pump to said second receptacle to supply water thereto and thereby increase the weight thereof, and means interposed in said last-named connection and responsive to the flow of liquid from said pump to said first receptacle for regulating the flow of liquid to said second receptacle to thereby regulate the weight of both receptacles in accordance with the difference in specific gravity between the oxidant-displacing liquid in the first receptacle and oxidant displaced.

5. In a fuel supply system for an internal combustion engine mounted in a water-borne vehicle, the combination of a variable volume container having a movable wall and containing fluid oxidant for supporting combustion of fuel in said engine, a connection between the interior of said container and said engine, a receptacle exterior of said container and enclosing said wall, a second separate receptacle, a pump driven by said engine and having its input connected to the water surrounding the vehicle and its output connected to said first receptacle for supplying water under pressure thereto for moving the wall thereof and thereby to express oxidant from said container to said engine, a connection from said pump to said second receptacle, and means interposed in said last-named connection and responsive to the flow of water from said pump to said first receptacle for regulating the flow of water to said second receptacle.

6. In a fuel supply system for an internal combustion engine mounted in a water-borne vehicle, the combination of a variable volume container having a movable wall and containing fluid oxidant for supporting combustion of fuel in said engine, a connection between the interior of said container and said engine, a receptacle exterior of said container and enclosing said wall, a second separate receptacle secured to said first receptacle, a pump driven by said engine and having its input connected to the water surrounding the vehicle and its output connected to said first receptacle for supplying water under pressure thereto for moving the wall thereof and thereby to express oxidant from said container to said engine, a connection from said pump to said second receptacle to supply water thereto and thereby increase the weight thereof, and means interposed in said last-named connection and responsive to the flow of water from said pump to said first receptacle for regulating the flow of water to said second receptacle to thereby regulate the weight of both receptacles in accordance with the difference in specific gravity between the oxidant-displacing liquid in the first receptacle and oxidant displaced.

7. In a fuel supply system for an internal combustion engine mounted in a water-borne vehicle, the combination of a collapsible container of fluid oxidant for supporting combustion of fuel in said engine, a connection between the interior of said container and said engine, a receptacle for said container, a second separate receptacle, a pump driven by said engine and having its input connected to the water surrounding the vehicle and its output connected to said first receptacle for supplying water under pressure thereto to collapse said container and thereby express oxidant therefrom to said engine, a connection from said pump to said second receptacle, and means interposed in said last-named connection and responsive to the flow of water from said pump to said first receptacle for regulating the flow of water to said second receptacle.

8. In a fuel supply system for an internal combustion engine, the combination of a variable volume container having a movable wall and containing fluid oxidant for supporting combustion of fuel in said engine, a connection between the interior of said container and said engine, a receptacle exterior of said container and enclosing said wall, a source of liquid, a pump connected to said source and having its output connected to said receptacle for supplying liquid under pressure thereto for moving the wall thereof and thereby to express oxidant under pressure from said container to the engine, and means interposed in said connection and responsive to the pressure of the oxidant in said connection for regulating the flow of oxidant in the latter.

9. In a fuel supply system for an internal combustion engine, the combination of a variable volume container having a movable wall and containing fluid oxidant for supporting combustion of fuel in said engine, a connection between the interior of said container and said engine, a receptacle exterior of said container and enclosing said wall, a source of liquid, a pump connected to said source and having its output connected to said receptacle for supplying liquid under pressure thereto for moving the wall thereof and thereby to express oxidant under pressure from said container to the engine, and means interposed in said connection and responsive to the speed of the engine for regulating the flow of oxidant to said engine.

10. In a fuel supply system for an internal combustion engine, the combination of a variable volume container having a movable wall and containing fluid oxidant for supporting combustion of fuel in said engine, a connection between the interior of said container and said engine, a receptacle exterior of said container and enclosing said wall, a source of liquid, a pump connected to said source and having its output connected to said receptacle for supplying liquid under pressure thereto for moving the wall thereof and thereby to express oxidant under pressure from said container to the engine, and means interposed in said connection and jointly responsive to the speed of the engine and the oxidant pressure in said connection for regulating the flow of oxidant in the latter.

11. In a fuel supply system for an internal combustion engine, the combination of a variable volume container having a movable wall and containing fluid oxidant for supporting combustion of fuel in said engine, a connection between the interior of said container and said engine, a receptacle exterior of said container and enclosing said wall, a source of liquid, a pump connected to said source and having its output connected to said receptacle for supplying liquid under pressure thereto for moving the wall thereof and thereby to express oxidant under pressure from said container to the engine, normally inactive means interposed in said connection and responsive to the pressure of the oxidant in said connection for regulating the flow of oxidant in the latter, and manual control means operatively connected to said oxidant flow regulating means for activating the same.

12. In a fuel supply system for an internal combustion engine, the combination of a variable volume container having a movable wall and containing fluid oxidant for supporting combustion of fuel in said engine, a connection between the interior of said container and said engine, a receptacle exterior of said container and enclosing said wall, a source of liquid, a pump connected to said source and having its output connected to said receptacle for supplying liquid under pressure thereto for moving the wall thereof and thereby to express oxidant under pressure from said container to the engine, normally inactive means interposed in said connection and responsive to the speed of the engine for regulating the flow of oxidant to said engine, and means operatively connected to said oxidant flow regulating means for activating the same.

13. In a fuel supply system for an internal combustion engine, the combination of a variable volume container having a movable wall and containing fluid oxidant for supporting combustion of fuel in said engine, a connection between the interior of said container and said engine, a receptacle exterior of said container and enclosing said wall, a source of liquid, a pump connected to said source and having its output connected to said receptacle for supplying liquid under pressure thereto for moving the wall thereof and thereby to express oxidant under pressure from said container to said engine, normally inactive means interposed in said connection and jointly responsive to the speed of the engine and to the oxidant pressure in said connection for regulating the flow of oxidant in the latter, and means operatively connected to said oxidant flow regulating means for activating the same.

14. In a fuel supply system for an internal combustion engine, the combination of a variable volume container having a movable wall and containing fluid oxidant for supporting combustion of fuel in said engine, a connection between the interior of said container and said engine, a receptacle exterior of said container and enclosing said wall, a source of liquid, a pump connected to said source and having its output connected to said receptacle for supplying liquid under pressure thereto for moving the wall thereof and thereby to express oxidant under pressure from said container to said engine, means interposed in said connection for regulating the flow of oxidant to said engine, and common control means operatively connected to said pump and said oxidant flow regulating means for simultaneously controlling the pressure and supply of oxidant.

15. In a fuel supply system for an internal combustion engine, the combination of a variable volume container having a movable wall and containing fluid oxidant for supporting combustion of fuel in said engine, a connection between the interior of said container and said engine, a receptacle exterior of said container and enclosing said wall, a source of liquid, a pump connected to said source and having its output connected to said receptacle for supplying liquid under pressure thereto for moving the wall thereof and thereby to express oxidant under pressure from said container to said engine, means interposed in said connection and responsive to the pressure of oxidant therein for regulating the flow of oxidant to said engine, and common control means operatively connected to said pump and said oxidant flow regulating means for simultaneously controlling the pressure and supply of oxidant.

16. In a fuel supply system for an internal combustion engine, the combination of a variable volume container having a movable wall and containing fluid oxidant for supporting combustion of fuel in said engine, a connection between the interior of said container and said engine, a receptacle exterior of said container and enclosing said wall, a source of liquid, a pump connected to said source and having its output connected to said receptacle for supplying liquid under pressure thereto for moving the wall thereof and thereby to express oxidant under pressure from said container to said engine, means interposed in said connection and responsive to the speed of the engine for regulating the flow of oxidant to said engine, and common control means operatively connected to said pump and said oxidant flow regulating means for simultaneously controlling the pressure and supply of oxidant.

References Cited in the file of this patent

UNITED STATES PATENTS

| | | |
|---|---|---|
| 703,824 | Quinn | July 1, 1902 |
| 970,210 | Fuller | Sept. 13, 1910 |
| 1,399,263 | Lantz | Dec. 6, 1921 |
| 2,325,619 | Lysholm | Aug. 3, 1943 |
| 2,720,856 | Hoke | Oct. 18, 1955 |

FOREIGN PATENTS

| | | |
|---|---|---|
| 401,917 | France | Aug. 14, 1909 |